Figure 2:
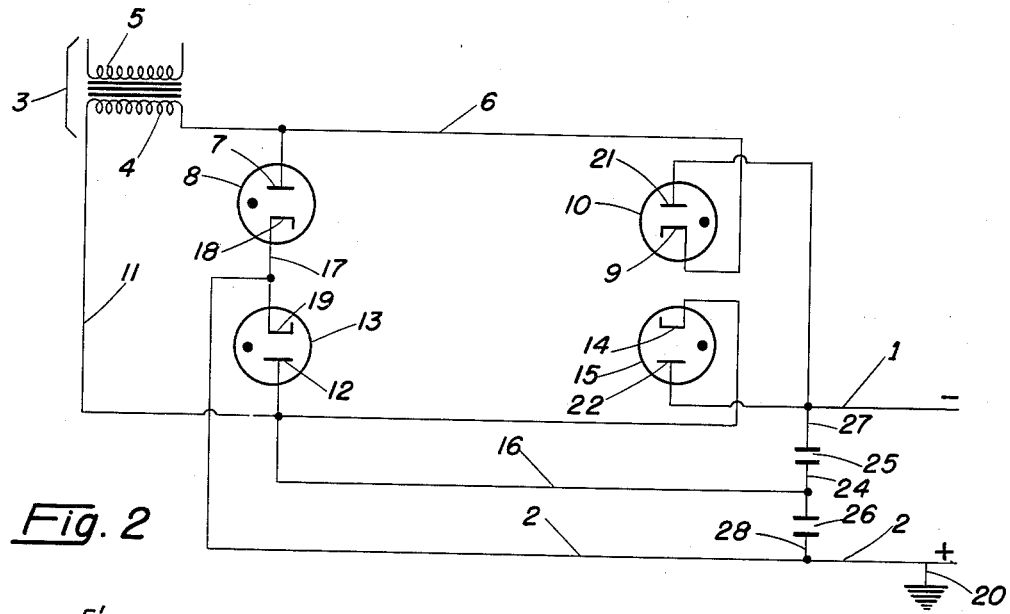

April 3, 1956
R. S. DIGGS
2,740,938
RECTIFIED ALTERNATING CURRENT CABLE
FAULT REDUCING CIRCUITS
Filed June 4, 1951
2 Sheets-Sheet 1
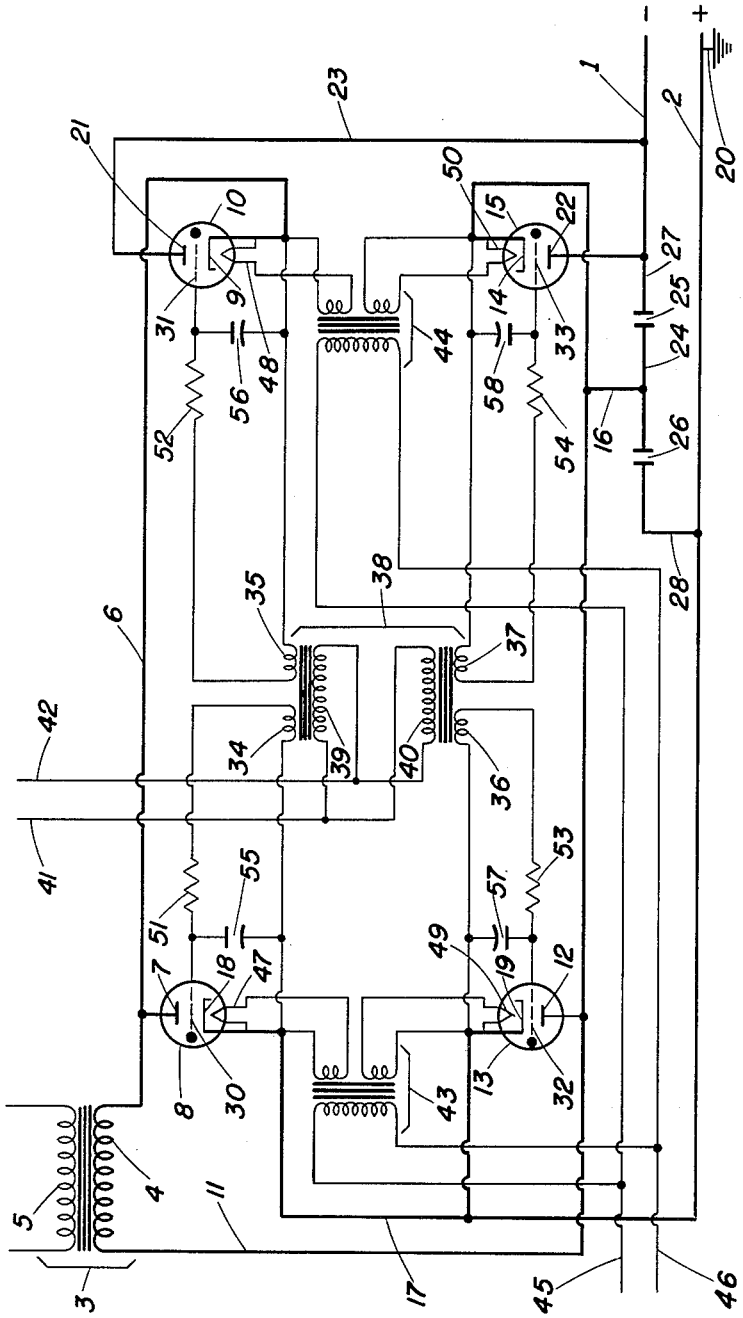
Fig. 1
INVENTOR.
ROBERT S. DIGGS
BY
ATTORNEY April 3, 1956

R. S. DIGGS 2,740,938

RECTIFIED ALTERNATING CURRENT CABLE
FAULT REDUCING CIRCUITS

Filed June 4, 1951

2 Sheets-Sheet 2

INVENTOR.
ROBERT S. DIGGS

BY

ATTORNEY

United States Patent Office 2,740,938
Patented Apr. 3, 1956

2,740,938

RECTIFIED ALTERNATING CURRENT CABLE FAULT REDUCING CIRCUITS

Robert S. Diggs, Wallingford, Pa.

Application June 4, 1951, Serial No. 229,856

5 Claims. (Cl. 324—54)

This invention relates to means for locating electrical faults in cables and like electrical transmission elements and particularly to means for applying a relatively high voltage to the fault for a short time to reduce its resistance and permit appreciable current at lower voltage to flow through it as, for example, between one of the conductors and the cable sheath, whereby the location of the fault may be determined. However the instruments used to locate the fault after such "tracer" circuit through it has been established are well known and form no part of the invention, which is especially directed to facilitating the passage of current through the fault itself not only initially but also automatically upon spontaneous increase in fault resistance during a test.

Many faults when first discovered to exist are of high electrical resistance and it has been the practice to employ a rectifier, unit, or in some instances two or more of them connected in series or parallel, to supply high voltage for reducing that resistance to permit sufficient current to flow through it at relatively low voltage and preferably intermittently to constitute a signal whereby with the aid of the above mentioned instruments the fault may be located with reasonable accuracy preparatory to its elimination by suitable repair.

Some faults of extremely high resistance are not readily located in the usual way by means of the fault locater equipment now in general use. However, although the cable may possibly still be restored to service with a high resistance fault it may at any time become of relatively low resistance and cause further interruption of service. Therefore the fault should be located and corrected as promptly as possible.

It is an object of the present invention to provide an improvement in thyratron and similar cable fault reduction circuits whereby for use on high resistance faults the voltage output of the conventional bridge rectifier fault reduction circuit may be doubled.

A further object is to provide an alternating current rectifying circuit adapted for use in fault reduction and localization sets to supply up to double the maximum voltage output of the conventional fault reduction circuit to reduce the resistance at the fault, which is automatically operative thereafter to provide increased current at lower voltage while the fault is being further reduced or located and to again increase the voltage output upon any subsequent substantial increase in the resistance of the fault, for example as a result of heat developed therein drying out wet insulation.

Figure 3:
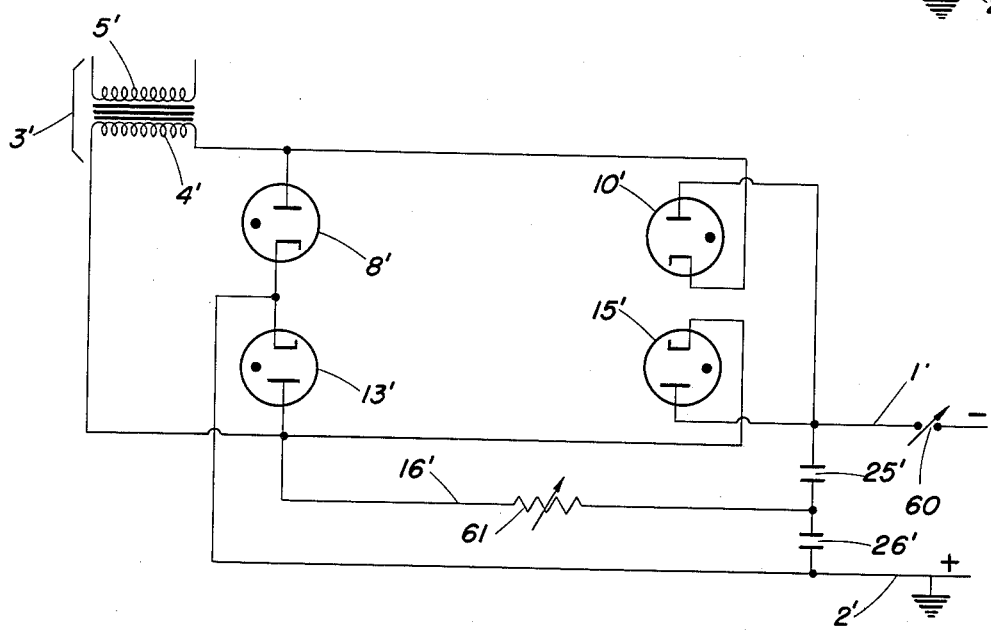

Other objects, purposes and advantages of the invention will hereinafter more fully appear or will be understood from the following description of certain embodiments of it in which reference will be had to the accompanying drawings diagrammatically representing the circuits employed therein, Fig. 1 being a detailed diagram of the complete rectifying circuit embodying the invention;

Fig. 2, a simplified diagram of the same in which conventional elements accessory to the operation of thermionic tubes utilized in the circuit are omitted; and Fig. 3, a diagram generally similar to Fig. 2 but showing the circuit connected for use as a surge generator wherein the capacitors of the circuit of Fig. 2 are charged to the full output voltage of the circuit and arranged to discharge high impulse currents of short duration into the equipment being tested.

Referring now more particularly to the drawings it will be understood the circuits therein illustrated are designed for connection with certain control apparatus (not shown) whereby when the D. C. output conductors of the circuit are connected respectively, for example, to a conductor and to the sheath of cable to be tested the rectifying circuit may be operated to deliver the required voltage thereto initially at a maximum value for breaking down the resistance of a fault and thereafter intermittently but at a lower value for supplying a signal current perceptible with the aid of suitable instruments for locating the fault, increase of voltage upon substantial increase in fault resistance following its initial reduction occurring automatically without the intervention of any extraneous control mechanism.

Specifically the circuit shown in Fig. 1 provides elements designed to deliver at output conductors 1, 2 a direct current the energy for development of which is derived from a main transformer 3 comprising a secondary winding 4 for supplying current to be rectified in the circuit by appropriate rectifying elements. The primary winding 5 of this transformer when the circuit is in operation is connected to an alternating current source, for example a 230-volt, 60-cycle supply under control of an induction regulator (not shown) forming part of the standard control mechanism. One lead 6 of the transformer secondary is connected to the anode 7 of a thyratron tube 8 and to the cathode 9 of a second thyratron tube 10 while the other lead 11 of the transformer is connected to the anode 12 of a third thyratron tube 13, to the cathode 14 of a fourth such tube 15 and to a conductor 16 the functions of which will hereafter appear.

A conductor 17 interconnects the cathodes 18, 19 of tubes 8 and 13 respectively and D. C. output lead 2 is connected to this conductor and also has a ground connection 20, while the anodes 21, 22 of tubes 10, 15 respectively are connected together and to D. C. output lead 1 by a conductor 23.

Conductor 16 connects transformer lead 11 to a common conductor 24 between a pair of capacitors 25, 26, the opposite terminals of which are interconnected respectively through leads 27, 28 with output leads 1, 2; the electrical capacity of capacitors 25, 26 in a circuit designed to develop up to about 28,000 volts should be in the neighborhood of approximately at least 0.1 microfarad when the rectifying elements are thyratron or phanatron tubes.

As illustrated in Fig. 1 the grids 30, 31, 32, 33 of the several tubes are energized from corresponding secondary windings 34, 35, 36, 37 of a grid transformer 38, the primary windings 39, 40 of which are connected in parallel and supplied with current through leads 41, 42 suitably controlled by equipment (not shown) of the usual character. Filament transformers 43, 44, supplied from leads 45, 46 deliver current to the filaments 47, 48, 49, 50 of the several tubes and suitable control means (not shown) are also interposed in the primary circuits of these transformers. Resistors 51, 52, 53, 54 preferably of about 1000 ohms each and condensers 55, 56, 57, 58 of 0.01 microfarad capacity are connected as usual in the grid circuits.

In Fig. 2 which is a simplified diagram of the same circuit as Fig. 1, the several elements represented are designated by the same reference characters, and in the following description of their operation and effects it will be understood the elements not represented nevertheless are employed in practising the invention and normally connected as has been described. Now let it be assumed a cable is known to have or suspected of having a high resistance fault at some point remote from the power distribution point, for example between one of its conductors and its sheath due to partial failure of insulation; for purposes of demonstrating automatic operation of the rectifier circuit under certain conditions it will be assumed further the fault involves wet insulation.

With the main D. C. output leads 1, 2 connected respectively to the cable conductor and the cable sheath, the tube grids and filaments energized from their respective transformers and A. C. voltage supplied to primary winding 5 of transformer 3, there is induced a corresponding A. C. voltage in transformer secondary winding 4. When this transformer is energized the right hand end of winding 4 is positive relatively to the other end during one-half of each A. C. cycle and positive current flow from anode 7 to cathode 18 of tube 8 is initiated but due to the high resistance of the fault connected across leads 1, 2 little if any of this current flows through the fault; instead it initiates a positive charge on the lower plate of capacitor 26 considered as illustrated in Fig. 2 and a corresponding negative charge on its upper plate.

During the succeeding half cycle the left hand end of winding 4 is positive with respect to its right hand end and tube 10 therefore conducts, initiating a positive charge on the lower plate of capacitor 25 and a negative one on the upper; as these capacitor charges accumulate they maintain tubes 13 and 15 non-conductive and hence inoperative until the fault resistance has been substantially reduced as will hereafter appear, the operative portions of the circuit thus functioning as a conventional voltage doubler during this phase.

With no load on leads 1, 2 the capacitor charges therefore increase until the voltage of each attains up to 1.4 times the R. M. S. voltage delivered by secondary winding 4, and considering the capacitors as connected in series in the circuit which includes leads 1, 2 and the high resistance fault, through which no appreciable current flows at this time, the voltage impressed on the circuit can therefore attain up to 2.8 times the R. M. S. voltage delivered by the transformer secondary winding 4; thus with properly rated tubes and with 10,000 volts R. M. S. delivered by the transformer secondary winding 4, the voltage between leads 1 and 2 may approach 28,000 volts. Generally before this maximum voltage is attained current begins to flow through the fault, and retards further accumulation of charges on the capacitors 25 and 26. However, until the resistance of the fault is substantially reduced these charges continue sufficient to keep cathodes 19, 14 of tubes 13, 15 positive with respect to their anodes 12, 22 and said tubes therefore non-conductive.

While the voltage between leads 1 and 2 is maintained at a value sufficient to keep cathodes 19, 14 of the tubes 13, 15 positive with respect to their anodes 12 and 22, the voltage across the capacitor 25 will be of the same polarity as the voltage across the capacitor 26 with respect to the leads 1 and 2, and the circuit functions as a conventional full-wave voltage doubling rectifier circuit.

However, as appreciable current begins to flow through the fault it carbonizes defective insulation or otherwise reduces the resistance of the connection between the conductor and sheath at the fault and as this resistance decreases the voltage across both these capacitors drops. When the voltage between leads 1 and 2 declines to a value less than approximately 1.524 times the R. M. S. voltage delivered by the transformer secondary winding, the voltages across each of the two capacitors 25 and 26 are no longer continuously of the same polarity, as they will then alternately reverse in polarity during part of each cycle. Accordingly, during part of each cycle, the polarities of the cathodes 19, 14 of tubes 13, 15 are alternately reversed, with corresponding periods of conduction. As the fault resistance continues to decrease, the tubes 13, 15 will conduct for half of each cycle and the circuit will operate as a conventional full-wave bridge rectifier, with the capacitors 25 and 26 negligibly affecting the circuit. By suitable control of the grids of the several tubes by the control equipment connected to leads 41 and 42 the current through the fault now may be periodically interrupted to produce an intermittent "tracer" signal detectable in the field by known fault locating instruments, for example a series of "on" periods of one-half second duration during which voltage of proper polarity is applied to the grids of tubes 13 and 15 to render them conducting, each alternating with one and one-half second "off" periods during which voltage of proper polarity is applied to the grids of tubes 13 and 15 to render them non-conducting.

If, however, the resistance at the fault should substantially increase as by drying out of defective wet insulation while the circuit is reducing the fault or supplying a signal, the charge across capacitors 25, 26 and the voltage between leads 1 and 2 automatically increases. When this voltage attains a value equal to or in excess of approximately 1.524 times the transformer secondary winding R. M. S. voltage, the polarity of the cathodes of tubes 13, 15 is again reversed by the voltage on capacitors 25, 26 and these tubes thereupon automatically stop conducting. The circuit therefore automatically resumes operation as a voltage doubler and further increases the charge on capacitors 25, 26 to an extent determined by the increased resistance at the fault until it attains a value sufficient to break down the latter and re-establish a relatively low resistance path for the current, whereupon the capacitor voltage again decreases and the circuit automatically resumes operation as a bridge rectifier.

Although I have described my circuit using thyratron tubes as rectifying elements, presently available thyratron tubes are not rated for inverse peak voltages in excess of 14,000 volts. I therefore may use phanatron tubes in place of thyratron tubes 8, 10, presently available phanatron tubes having inverse peak voltages of 28,000 volts, or two or more thyratron or phanatron tubes in series in order to withstand higher inverse peak voltages. Phanatron tubes like thyratron tubes are hot cathode mercury vapor tubes but lack the grid control of the latter; they conduct when the plate is positive with respect to the cathode and usually have a higher inverse peak voltage rating than the comparable thyratrons. Due to the lack of grid control of the phanatron tubes, the intermittent signal for the fault locating is derived from a current flowing continuously but at varying values, for example, if capacitors 25, 26 are each 0.1 microfarad capacity, the output current will be 0.3 ampere instead of zero during an "off" period of the tracer signal and at 5.0 amperes during an "on" period, which offers no complications in detecting the signal in the field or locating the fault.

It should be understood that although I have described my rectifying elements as being thyratron or phanatron tubes, my improved circuit is equally adaptable to the use of any other types of suitable rectifiers such as other thermionic valves or metallic rectifiers such as copper oxide, selenium oxide or the like.

In some instances it may be necessary to impress upon the fault even higher voltages than obtainable with the circuits thus far described, as when the initial resistance of the fault is insufficient to enable the capacitors 25, 26 to be charged to peak voltage and yet too high to permit an adequate signal or tracer circuit to be maintained by relatively low voltage. In such instances a circuit such as diagrammed in Fig. 3 may be employed, many elements of which are the same as in the preceding figures and are designated in Fig. 3 with the same numerals to each of which is appended a prime ('). In addition this circuit includes a variable gap 60 interposed in D. C. lead 1', between capacitor 25' and the fault and a variable resistor 61 in conductor 16' or elsewhere in the circuit for limiting the charging rate of capacitors 25', 26'. The gap is held open during charging of the capacitors and until they attain their peak voltage, at which point the gap is momentarily closed to thereby impress on the fault the maximum voltage attainable by the circuit, and if the first impulse is insufficient to enable normal fault locating operations to be undertaken successive maximum voltage impulses may be applied to the fault in like manner until its resistance is reduced to an extent sufficient to enable its location as heretofore described, the circuit of Fig. 3 operating when gap 60 is closed in substantially the same manner as that of Figs. 1 and 2. Also, the repetitive surges may be used as the tracer signal to locate the fault.

While I have described my invention with considerable particularity especially as embodied in certain circuits specifically diagrammed in the drawings and have suggested certain modifications which may be employed when appropriate it will be understood I do not desire or intend thereby to limit or confine myself in any way as other changes and modifications in the circuits employed, in the specific type of rectifying elements and other instrumentalities comprised in them and in the manner of their use will readily occur to those skilled in the art and may be made if desired without departing from the spirit and scope of the invention as defined in the appended claims.

Having thus described my invention, I claim and desire to protect by Letters Patent of the United States:

1. In cable fault reducing apparatus of the character described, a rectifying circuit comprising a source of alternating current, a first pair of rectifying elements connected in series in conducting relation, a second pair of rectifying elements connected in series in conducting relation, said pairs of elements being connected to said source for conduction alternately therefrom in opposite directions, a direct current output circuit connected between the respective elements of each of said pairs of elements, and a pair of capacitors connected in series across said direct current output circuit with the common terminal of said capacitors connected to one of the terminals of said source for inhibiting conduction by the elements connected to said terminal when the voltage of the capacitors exceeds a predetermined value relative to the voltage of said source.

2. The invention set forth in claim 1 characterized in that said last mentioned elements are maintained nonconductive under conditions of no load in said direct current output circuit.

3. In cable fault reducing apparatus of the character described, a rectifying circuit comprising a source of alternating current, a first pair of rectifying elements connected in series in conducting relation, a second pair of rectifying elements connected in series in conducting relation, said pairs of elements being connected to said source for conduction alternately therefrom in opposite directions, a direct current output circuit connected between the respective elements of each of said pairs of elements, and a pair of capacitors connected in series across said direct current output circuit with the common terminal of said capacitors connected to one of the terminals of said source operative to inhibit conduction by the elements connected to said terminal when the voltage of the capacitor is in excess of a predetermined value relative to the voltage of said source, said last mentioned elements conducting when the voltage of the capacitors is less than said predetermined value.

4. The invention set forth in claim 3 characterized in having a variable resistance load connected in said output circuit, the characteristics of said load being so related to the constants of said rectifying circuit that the voltage across said output circuit exceeds said predetermined value of voltage when the resistance of said load exceeds a predetermined value of resistance and said voltage across said output circuit is reduced below said predetermined value of voltage when the resistance of said load is less than said predetermined value of resistance.

5. In cable fault reducing apparatus of the character described, a rectifying circuit comprising a direct current output circuit, a first branch circuit having a pair of rectifiers in series-conducting relation with said output circuit connected between said rectifiers, a second branch circuit having another pair of rectifiers in series-conducting relation with said output circuit connected between the second branch rectifiers for conduction of current through said output circuit in the same direction as in said first branch circuit, a source of alternating current, said first branch circuit being connected across said source for conduction of current therefrom in one direction and said second branch circuit being connected across said source for conduction of current therefrom in the opposite direction, and a pair of capacitors connected in series across said output circuit with the common connection of said capacitors connected to one terminal of said source and to the rectifier in each pair connected to said terminal for inhibiting conduction by said last mentioned rectifiers when the voltage of the capacitors exceeds a predetermined value relative to the voltage of said source.

References Cited in the file of this patent

UNITED STATES PATENTS

| | | |
|---|---|---|
| 1,729,753 | Stryker et al. | Oct. 1, 1929 |
| 2,324,835 | Hagenguth | July 20, 1943 |
| 2,565,307 | Harding et al. | Aug. 21, 1951 |
| 2,707,267 | Gavin | Apr. 26, 1955 |